United States Patent [19]

Karsh et al.

[11] 4,037,767
[45] July 26, 1977

[54] TAPE TRANSPORTING APPARATUS

[75] Inventors: Herbert Karsh, Laguna Beach; Edgar S. Gilchrist, Newport Beach, both of Calif.

[73] Assignee: Bell & Howell Company, Chicago, Ill.

[21] Appl. No.: 632,322

[22] Filed: Nov. 17, 1975

[51] Int. Cl.² ............................................. B65H 17/32
[52] U.S. Cl. ....................................... 226/7; 226/97; 226/197
[58] Field of Search ............... 226/7, 97, 195–199; 73/143, 144

[56] References Cited
U.S. PATENT DOCUMENTS

| | | | |
|---|---|---|---|
| 3,201,985 | 8/1965 | Williams | 226/97 X |
| 3,861,207 | 1/1975 | Barbee | 73/144 |
| 3,918,092 | 11/1975 | Rueger | 226/7 X |

Primary Examiner—Robert W. Saifer
Attorney, Agent, or Firm—Benoit Law Corporation

[57] ABSTRACT

An apparatus for transporting tape includes an improvement for suppressing a predetermined flutter component comprising a member defining a surface for guiding the tape, equipment extending to that tape guiding surface and defining a gas column having a resonance frequency corresponding to the frequency of the flutter component, and equipment operatively associated with the surface defining member for coupling the gas column to the tape. This coupling equipment is of a type which establishes and maintains at the gas column a gas film of a controlled thickness between the guiding surface and the tape.

29 Claims, 4 Drawing Figures

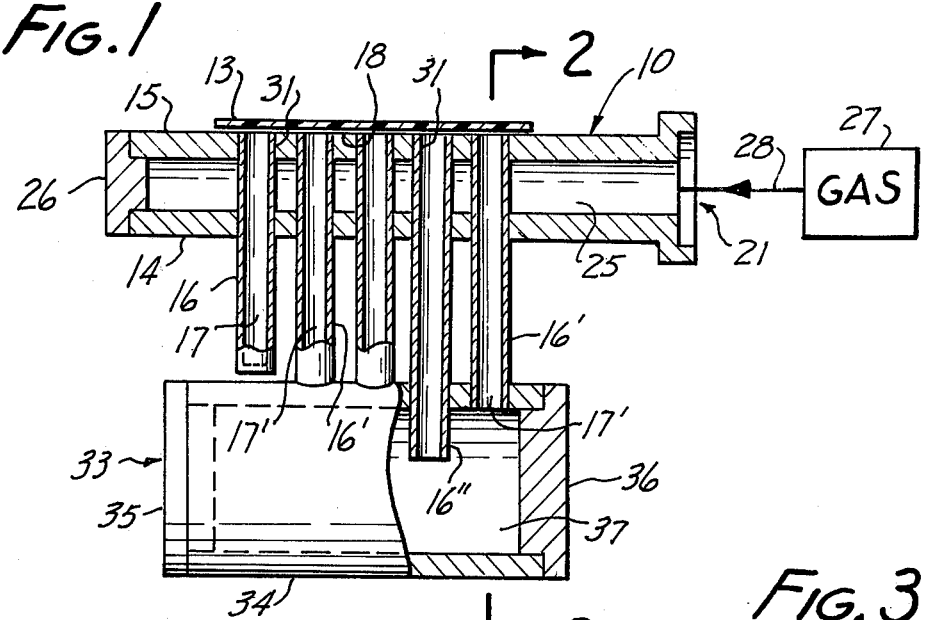
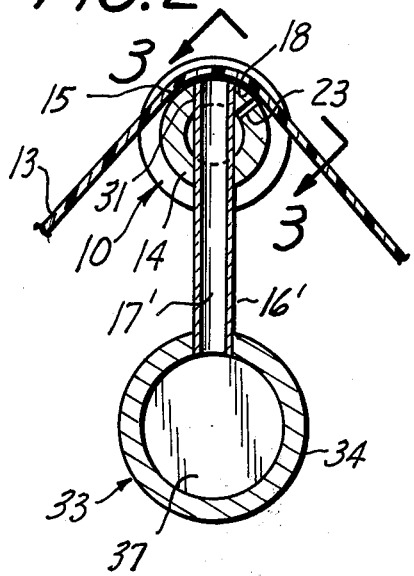
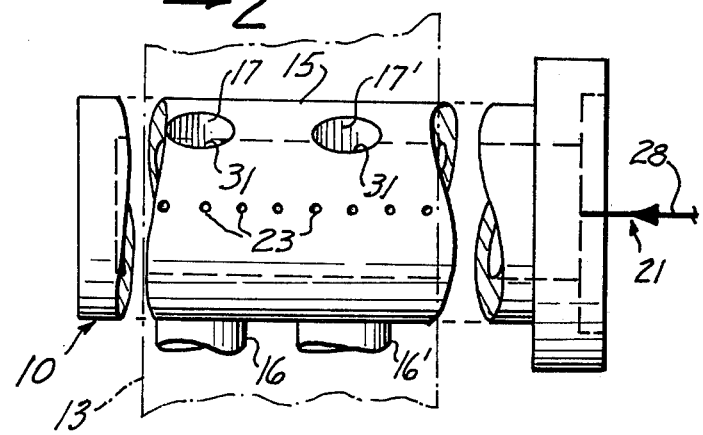
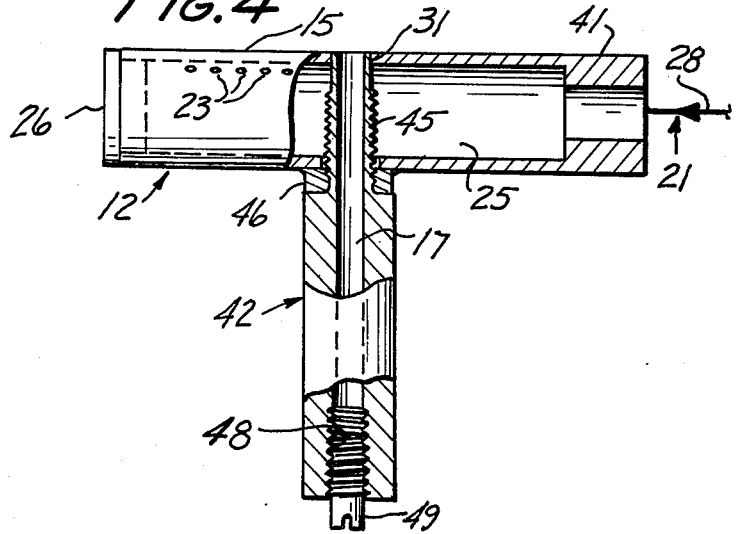

4,037,767

TAPE TRANSPORTING APPARATUS

BACKGROUND OF THE INVENTION

1. Field of the Invention

The subject invention relates to apparatus for transporting tape including, but not limited to, magnetic recording tape and photographic film, and comprising an improvement for suppressing a predetermined flutter component.

2. Description of the Prior Art

In obtaining low flutter performance from tape transport machines, the limits to flutter reduction are frequently set by resonances within the tape path. In the extreme case, the self-resonance of the tape mass and its elasticity provide a peak of flutter which usually lies outside of the band of servo correction. Typical techniques of attempting to suppress this resonance involve the addition of rollers, pads or other devices which serve to dampen the resonance, either by means of coulomb friction or viscous damping.

In dealing with this type of damping in wideband servos, the damping mechanism itself must not introduce additional low frequency resonances either individually or in conjunction with the tape. This, in turn, implies that the damping mechanism must be of extremely low inertia. In general, the effect of damping devices is not only to reduce the resonant peak, but also to add a generalized flutter component resembling white noise over the entire spectrum. In consequence, very little improvement or no net improvement at all is realized.

A different type of tunable damping for improving tape velocity-fluctuation performance in tape transports is disclosed in U.S. Pat. No. 3,258,183, by Max Weissbach, issued June 28, 1966 and herewith incorporated by reference herein. The technique disclosed in that patent proceeds on the basis of a development of a slight depression or pucker in an elongate tape within a tape transport vacuum column for the purpose of damping small variations in velocity due, primarily, to variations in web tension during a rapid start in tape motion. Basically, that prior-art technique contemplates an adjustable device connected to the vacuum connection of the vacuum column for a small vacuum recess to adjust the magnitude of the vacuum pull. In particular, that reference proposes the provision of a coupling tube in the vacuum connection having a length equal to approximately ⅛ of the wave length of the particular frequency sought to be eliminated from the tape fluctuation during the start cycle. In the equipment according to that reference, a threaded plug renders the tape velocity-fluctuation damper tunable, in order to provide an adjustable device which has the purpose of greatly reducing the shock waves generated along the tape immediately after start of tape motion and of reducing the time required for tape speed stabilization at the start of tape motion.

By being operative in the vacuum coupling of the equipment, the damping device according to the latter reference cannot be fully effective as an energy-absorbing gas column and is also affected by changes in the vacuum intensity. The provision of the depression or pucker according to the teaching of the latter reference also results in a localized lack of a definite tape guiding surface.

Further vacuum buffering equipment is apparent from U.S. Pat. Nos. 3,065,892 and 3,148,816 while U.S. Pat. No. 3,379,353 shows a positive pressure buffer device for magnetic tape transports. Other prior-art tape damping equipment is apparent from U.S. Pat. Nos. 3,231,165, 3,420,424, 3,495,046, 3,680,734, 3,680,756 and 3,813,019, which are herewith incorporated by reference herein.

SUMMARY OF THE INVENTION

It is a general object of this invention to overcome the above mentioned disadvantages and to provide tape transports including improved equipment for suppressing a predetermined flutter component.

It is a related object of this invention to provide improved equipment for suppressing a predetermined flutter component in tape transport apparatus.

It is also an object of this invention to provide improved means for coupling a gas column to the tape in equipment for suppressing a predetermined tape flutter component.

Other objects will become apparent in the further course of this disclosure.

From one aspect thereof, the subject invention resides in apparatus for transporting a tape and, more specifically, resides in the improvement for suppressing a predetermined flutter component comprising, in combination, first means for defining a surface for guiding said tape, second means extending to said tape guiding surface and defining a gas column having a resonance frequency corresponding to the frequency of said flutter component, and third means operatively associated with said first means for coupling said gas column to said tape, including means for establishing and maintaining at said gas column a gas film of a controlled thickness between said guiding surface and said tape.

From another aspect thereof, the subject invention resides in apparatus for transporting a tape and, more specifically, resides in the improvement comprising, in combination, means defining a convex tape guiding surface and having first and second distinct apertures in said convex tape guiding surface, means connected to said first aperture for issuing pressurized gas through said first aperture in said convex tape guiding surface, and means defining an air column extending through said second aperture in said convex tape guiding surface and having a resonance frequency corresponding to a tape flutter frequency to be suppressed.

BRIEF DESCRIPTION OF THE DRAWINGS

The invention and its aspects and objects will become more readily apparent from the following detailed description of preferred embodiments thereof, illustrated by way of example in the accompanying drawings, in which like reference numerals designate like or functionally equivalent parts, and in which:

FIG. 1 is a side view, partially in section, of a tape flutter component suppression device in accordance with a first preferred embodiment of the subject invention;

FIG. 2 is a section, taken along the line 2—2 in FIG. 1;

FIG. 3 is a detailed view, on an enlarged scale, taken along the line 3—3 in FIG. 2; and FIG. 4 is a side view, partially in section, of a tape flutter component suppression device in accordance with a further preferred embodiment of the subject invention.

DESCRIPTION OF PREFERRED EMBODIMENTS

In terms of utility, tape flutter component suppression devices according to the subject invention may be employed in magnetic tape transports or in other equipment wherein a tape is advanced and a suppression of a flutter component would be desirable. The term "tape" is employed in a broad sense, to cover not only magnetic recording tape, but also photographic film and other tape of web-like materials.

By way of example, the tape flutter component suppression devices may be employed as tape guide posts or as turnaround posts or elements in magnetic recording tape or photographic film transporting equipment. By way of example, the devices according to the subject invention may be employed in such manner in the magnetic tape or microfilm camera equipment shown in the following patents which are herewith incorporated by reference herein:

U.S. Pat. 2,904,275, by Selsted et al, issued Sept. 15, 1959;
U.S. Pat. 3,016,207, by Comstock 3D, issued Jan. 9, 1962;
U.S. Pat. 3,112,473, by Wicklund et al, issued Nov. 26, 1963;
U.S. Pat. 3,137,453, by Wooldridge, Jr., issued June 16, 1964;
U.S. Pat. 3,478,985, by Tobey, issued Nov. 18, 1969;
U.S. Pat. 3,667,700, by Carney et al, issued June 6, 1972; and
U.S. Pat. 3,677,159, by Studley, July 18, 1972.

By way of background, flutter is velocity fluctuation and it peaks because the tape stretches and has mass. The subject flutter component suppression device can be effective where a bend in the tape or web converts fluctuations along the tape or web to fluctuations normal to the tape or web.

The device 10 according to the illustrated preferred embodiment shown in FIGS. 1 to 3, and the device 12 according to the illustrated preferred embodiment shown in FIG. 4, have the purpose of suppressing a predetermined flutter component as to a tape 13 which is advanced relative to the device 10 by any of the tape or film advance equipment shown in the above mentioned patents or by another conventional or desired tape advance system. The flutter component to be suppressed may either be a mechanical flutter of the tape itself or, such as in the case of a magnetic recording or other information carrier tape, an electric counterpart of such mechanical flutter.

In the preferred embodiment shown in FIGS. 1 to 3, the tape flutter component suppression device 10 includes a tape guiding post 14 having a cylindrical or otherwise convex tape guiding surface 15. In practice, the post 14 may be attached by conventional means (not shown) to any base plate or similar structure of a tape transport, microfilm camera or motion picture projector, for instance.

The device 10 also includes at least one tube 16 which extends to the tape guiding surface 15 and defines a gas column 17 having a resonance frequency corresponding to the frequency of the flutter component to be suppressed. By way of example, the tube 16 may have a length equal to one-quarter, one-half or another desired fraction of the wavelength of the flutter component to be suppressed. By way of background, column resonance is the means by which gas particle motion is enhanced and losses are maximized. The loss is mostly viscous drag at the column wall and possibly turbulence. The introduction of loss (damping) is the basic objective. The gas column 17 may, for instance, be a resonant air column.

The flutter component suppression equipment according to the subject invention also includes means for effectively coupling the gas column 17 to the tape 13 by means of a gas film 18 of a controlled thickness between the guiding surface 15 and the tape 13. This is an important feature which distinguishes the subject invention from prior-art proposals which lacked such an effective coupling and which were thus incapable of performing a reliable and continuously reproducible flutter suppression action of the type performed by the subject equipment.

In the illustrated preferred embodiments, the requisite gas film 18 is provided by equipment 21 for injecting gas at a controlled rate in between the guiding surface 15 and the tape 13. As a further advantage of the preferred embodiments of the subject invention, conventional tape air bearing techniques and equipment may be employed for the purpose of establishing the desired coupling gas film.

Accordingly, one or more first apertures 23 are provided in the tape guiding surface for issuing pressurized gas at a controlled rate toward the tape 13 to provide the controlled thickness gas film 18. The tape guiding post 14 has an axial bore 25 communicating with the first apertures 23. One end of the axial bore 25 is closed by a cap 26. A pressurized gas supply 27 is connected to the post 14 and the other end of the axial bore 25 via a line 28.

The components 27 and 28 are only symbolically shown in the drawings, since the gas supply 27 may be of a conventional type as employed in tape transports for feeding air bearing tape guides wiith air or another gas. Typcially, the supply 27 includes an air pump (not shown) and a valve or other regulating means for supplying pressurized air or another gas through a conventional, sumbolically illustrated line 28. The thickness of the air or gas film 18 is controlled by the number and size of the first apertures 23 and also by conventional pressure regulating means in the supply 27.

The tube 16 which defines the air colunn 17 extends through the tape guiding post 14 along a diameter thereof. In particular, the illustrated preferred embodiments have one or more second apertures 31 in the tape guiding surface 15, with any of these second apertures being distinct from any of the first apertures 23.

The tube 16 and the gas column 17 extends through a distinct second aperture 31 to the guiding surface 15 where the tube and gas column communicate with the gas film 18 and where the column 17 is coupled to the advancing tape 13 by that gas film 18.

In the illustrated preferred embodiments, the gas issuing first apertures 23 are distributed over the width of the tape guiding surface 15 covered by the advancing tape 13.

Similarly, in the preferred embodiment shown in FIGS. 1 to 3, the second apertures 31 are distributed over the width of the tape guide surface 15 as covered by the advancing tape 13, and the means for suppressing a tape flutter component includes further tubes 16' which define further gas columns 17' and which, together with the tube 16 and gas column 17, are distributed over the width of the tape guide surface 15.

In accordance with a further preferred embodiment of the subject invention, a resonance chamber may be connected to any of the gas columns or tubes. Thus, FIGS. 1 and 2 show a resonance chamber 33, connected to the tubes 16' and gas columns 17'. In practice, the resonance chamber 33 may also be connected to the tube 16 and gas column 17. However, the gas column 17 and, if desired, other gas columns may be distinct from the resonance chamber 33 so as to suppress a flutter component having a frequency which is different from the flutter component suppressed by the gas columns which are connected to the resonance chamber 33.

The resonance chamber 33 has a cylindrical housing 34 closed by end caps 35 and 36 to provide a cavity 37 which communicates with the gas columns 17' to modify the resonance frequency thereof to a desired value. The resonance chamber 33 or its cavity 37 are thus common to the plurality of gas columns 17' connected thereto.

In operation, the tape 13 is transported past the gas columns 17 and 17' along the guiding surface 15 annd rides on the gas film 18 while the coupled gas columns 17 and 17' absorb, on a selective basis, the energy in the region of the unwanted resonance so as to suppress the occurrence of one or more flutter components in accordance with the objectives of the subject invention.

The tape flutter component suppression device 12 shown in FIG. 4 has a tape guide post 41 which is similar to the guide post 14 in that it defines a convex or cylindrical tape guide surface 15, has a plurality of first apertures distributed over the width of the tape guide surface and supplied with gas from a supply 27 via a line 28 for establishing the requisite controlled thhickness coupling gas film 18 between the tape guide surface 15 and the tape 13, and is closed off by an end cap 26.

In similarlity to the tubes 16 and 16', a tubular member 42 extends in FIG. 4 along a diameter through the guide post 41 and through a second aperture 31 which is distinct from the first apertures 23. The tubular member 42 defines a gas column 17 which communicates with the gas film 18 between the tape guide surface 15 and the tape 13.

The preferred embodiment shown in FIG. 4 includes means for releasably attaching the tubular member 42 to the post 41. To this end, the tubular 42 has a threaded portion 45 which is threaded into a nut 46 that is attached to the post 41.

The tubular member 42 thus has a first threaded portion 45 and the tape guide post 41 has a second threaded portion 46 for threadably receiving the first threaded portion 45. In this manner, it is possible to exchange several tubular members which have air columns with different resonance characteristics for a selective suppression of flutter components having different frequencies.

As further shown in FIG. 4, the tubular member 42 has an internally threaded end portion 48 for receiving a threaded plug 49 that may be adjusted by rotation to trim or change the resonant characteristics of the gas column 17 for an increased precision suppression of undesired flutter components.

The modified flutter component suppression device 12 shown in FIG. 4 may be employed in addition to or in lieu of the suppression device 10 shown in FIGS. 1 to 3.

The subject extensive disclosure will suggest or render apparent various modifications and variations within the spirit and scope of the invention to those skilled in the art.

By way of example, the chamber 33 need not be a resonant chamber in all embodiments of the subject invention. Rather, the chamber 33 may be a non-resonant enclosure into which the tubes 16 and 16' are vented or terminated to prevent loss of air from the air bearing at the tape guiding surface 15. Also, the tubes may extend at various lengths or depths into the plenum or cavity 37 as shown at 16" in FIG. 1. The variety of attainable resonance frequencies may thus be enhanced.

We claim:

1. In apparatus for transporting a tape, an improvement for suppressing a predetermined flutter component, comprising in combination:
   first means for defining a surface for guiding said tape;
   second means extending to said tape guiding surface and defining a gas column having a resonance frequency corresponding to the frequency of said flutter component; and
   third means operatively associated with said first means for coupling said gas column to said tape, including means for establishing and maintaining at said gas column a gas film of a controlled thickness between said guiding surface and said tape;
   said third means including at least one first aperture in said guiding surface and means connected to said first aperture for issuing pressurized gas at a controlled rate through said first aperture and toward said tape to provide said controlled thickness gas film;
   said first means having a second aperture in said guiding surface, said second aperture being distinct from said first aperture; and
   said second means extending through said distinct second aperture to said guiding surface, including a tube communicating through said distinct second aperture with said gas film and forming said gas column including means defining a resonance chamber connected to said tube.

2. An apparatus as claimed in claim 1, wherein: said third means include means operatively associated with said first means for injecting gas at a controlled rate in between said guiding surface and said tape to provide said controlled thickness gas film.

3. An apparatus as claimed in claim 1, wherein: said second means include a plurality of gas columns distributed over the width of said guiding surface.

4. An apparatus as claimed in claim 3, wherein: said third means include at least one aperture in said guiding surface and means connected to said aperture for issuing pressurized gas at a controlled rate through said aperture and toward said tape to provide said controlled thickness gas film.

5. An apparatus as claimed in claim 3, wherein: said third means include a plurality of apertures located in and distributed over said guiding surface and means connected to said apertures for issuing pressurized gas at a controlled rate through said apertures and toward said tape to provide said controlled thickness gas film.

6. In apparatus for transporting a tape, an improvement for suppressing a predetermined flutter component, comprising in combination:
   first means for defining a surface for guiding said tape and defining an aperture in said guiding surface;
   second means extending through said aperture to said tape guiding surface and defining a gas column having a resonance frequency corresponding to the frequency of said flutter component; and third means operatively associated with said first means for coupling said gas column to said tape, including means for establishing and maintaining at said gas column a gas film of a controlled thickness between said guiding surface and said tape;

said second means including a tube communicating through said aperture with said gas film and a resonance chamber connected to said tube.

7. An apparatus as claimed in claim 6, wherein:
said third means include means operatively associated with said first means for injecting a gas at a controlled rate in between said guiding surface and said tape to provide said controlled thickness gas film.

8. In apparatus for transporting a tape, an improvement for suppressing a predetermined flutter component, comprising in combination:

first means for defining a surface for guiding said tape;
second means including a plurality of gas columns distributed over the width of said guiding surface and extending to said tape guiding surface and means defining a plenum chamber common and connected to said plurality of gas columns, at least one of said gas columns in conjunction with said plenum chamber having a resonance frequency corresponding to the frequency of said flutter component; and third means operatively associated with said first means for coupling said gas column to said tape, including means for establishing and maintaining at said gas column a gas film of a controlled thickness between said guiding surface and said tape.

9. In apparatus for transporting a tape, the improvement comprising in combination:

means defining a convex tape guiding surface and having first and second distinct apertures in said convex tape guiding surface;
means connected to said first aperture for issuing pressurized gas through said first aperture in said convex tape guiding surface; and
means defining an air column extending through said second aperture in said convex tape guiding surface and having a resonance frequency corresponding to a tape flutter frequency to be suppressed;
said means for defining said convex tape guiding surface comprising a tape guiding post having a cylindrical tape guiding surface;
said first and second apertures being located in said cylindrical tape guiding surface;
said means defining said air column including a tube having a first threaded portion; and
said means comprising said tape guide post including a second threaded portion for threadably receiving said first threaded portion.

10. An apparatus as claimed in claim 9, wherein:
said tape guiding post has an axial bore communicating with said first aperture; and
said pressurized gas issuing means include means connected to said post for applying pressurized gas to to said axial bore.

11. An apparatus as claimed in claim 9, wherein:
said air column defining means include a plurality of air columns distributed over the width of said convex tape guiding surface.

12. An apparatus as claimed in claim 9, wherein:

said means defining said air column include adjustable means at said tube for changing a dimension of said gas column.

13. In an apparatus for transporting a tape, the improvement comprising in combination:
means defining a convex tape guiding surface and having first and second distinct apertures in said convex tape guiding surface;
means connected to said first aperture for issuing pressurized gas through said first aperture in said convex tape guiding surface; and
means defining an air column extending through said second aperture in said convex tape guiding surface and having a resonance frequency corresponding to a tape flutter frequency to be suppressed, said means defining said air column including a tube extending through said tape guiding surface, and means defining a resonance chamber connected to said tube.

14. An apparatus as claimed in claim 13, including:
means defining a further air column extending through a distinct second aperture in said convex tape guiding surface and having a further resonance frequency corresponding to a further tape flutter frequency to be suppressed.

15. In apparatus for transporting a tape, the improvement comprising in combination:
means defining a convex tape guiding surface and having first and second distinct apertures in said convex tape guiding surface;
means connected to said first aperture for issuing pressurized gas through said first aperture in said convex tape guiding surface;
means defining a plurality of air columns distributed over the width of said convex tape guiding surface and extending through said second apertures in said convex tape guiding surface; and
means defining a resonance chamber common and connected to said plurality of air columns, at least one of said air columns in conjunction with said resonance chamber having a resonance frequency corresponding to a tape flutter frequency to be suppressed.

16. In apparatus for transporting a tape, the improvement comprising in combination:
means defining a convex tape guiding surface and having a plurality of first and second distinct apertures distributed over the width of said convex tape guiding surface;
means connected to said first apertures for supplying pressurized gas to, and issuing pressurized gas through said first apertures in said convex tape guiding surface; and
means defining a plurality of ar columns exending through said second apertures in said convex tape guiding surface and a resonance chamber common and connected to said plurality of air columns, said air column and resonance chamber having a resonance frequency corresponding to a tape flutter frequency to be suppressed.

17. In apparatus for transporting a tape, the improvement comprising in combination:
means defining a convex tape guiding surface and having first and second distinct apertures in said convex tape guiding surface;
means connected to said first aperture for issuing pressurized gas through said first aperture in said convex tape guiding surface;

means defining at least two air columns extending through said second apertures in said convex tape guiding surface; and means for providing a plenum chamber for at least said two air columns, said air columns in conjunction with said plenum chamber having different resonance frequencies corresponding to different tape flutter frequencies to be suppressed.

18. In apparatus for transporting a tape, the improvement comprising in combination:

means defining a convex tape guiding surface and having first and second distinct apertures in said convex tape guiding surface;

means connected to said first aperture for issuing pressurized gas through said first apertures in said convex tape guiding surface;

means defining a plurality of air columns distributed over the width of said convex tape guiding surface and extending through said second apertures in said convex tape guiding surface and having resonance frequencies corresponding to tape flutter frequencies to be suppressed;

means for providing a plenum chamber for at least two of said air columns; and tubes defining at least said two of said air columns and extending into said plenum chamber at different depths.

19. In apparatus for transporting a tape, an improvement for suppressing a predetermined flutter component, comprising in combination:

first means for defining a surface for guiding said tape;

second means including a resonance chamber and a tube extending from said resonance chamber to said tape guiding surface and defining a gas column having in conjunction with said resonance chamber a resonance frequency corresponding to the frequency of said flutter component; and third means operatively associated with said first means for coupling said gas column to said tape, including means for establishing and maintaining at said gas column a gas film of a controlled thickness between said guiding surface and said tape.

20. An apparatus as claimed in claim 19, wherein:

said third means include means operatively associated with said first means for injecting gas at a controlled rate in between said guiding surface and said tape to provide said controlled thickness gas film.

21. In apparatus for transporting a tape, an improvement for suppressing a predetermined flutter component, comprising in combination:

means defining a convex tape guiding surface and having first and second distinct apertures in said convex tape guiding surface and a first threaded portion;

means connected to said first aperture for issuing pressurized gas through said first aperture in said convex tape guiding surface; and means including a tube having a second threaded portion threadably received in said first threaded portion and defining an air column extending through said second aperture in said convex tape guiding surface and having a resonance frequency corresponding to a tape flutter frequency to be suppressed.

22. In apparatus for transporting a tape, an improvement for suppressing a predetermined flutter component, comprising in combination:

means defining a convex tape guiding surface and having first and second distinct apertures in said convex tape guiding surface;

means connected to said first aperture for issuing pressurized gas through said first aperture in said convex tape guiding surface; and means including a resonance chamber and a tube connected to said resonance chamber and defining an air column extending through said second aperture in said convex tape guiding surface and having in conjunction with said resonance chamber a resonance frequency corresponding to a tape flutter frequency to be suppressed.

23. In apparatus for transporting a tape, an improvement for suppressing flutter components, comprising in combination:

means defining a convex tape guiding surface and having first and second distinct apertures in said convex tape guiding surface;

means connected to said first aperture for issuing pressurized gas through said first aperture in said convex tape guiding surface; and means including tubes of different lengths for providing different air columns extending through said second apertures in said convex tape guiding surface and having different resonance frequencies corresponding to different tape flutter frequencies to be suppressed.

24. In a method for transporting a tape an improvement for suppressing a flutter component, comprising in combination:

defining a surface for guiding said tape;

providing a plurality of gas columns distributed over the width of said guiding surface and having resonance frequencies corresponding to frequencies of said flutter component;

coupling said gas columns to said tape, including the steps of establishing and maintaining at said gas column a gas film of a controlled thickness between aaid guiding surface and said tape; and defining a plenum chamber common and connected to said plurality of gas columns.

25. A method as claimed in claim 24, wherein:

said coupling includes injecting gas at a controlled rate in between said guiding surface and said tape to provide said controlled thickness gas film.

26. A method as claimed in claim 24, including the step of:

defining said plenum chamber as a resonance chamber connected to said gas columns.

27. In a method for transporting a tape, an improvement for suppressing a flutter component, comprising in combination the steps of:

defining a convex tape guiding surface and first and second distinct apertures in said convex tape guiding surface;

issuing pressurized gas through said first aperture in said convex tape guiding surface;

providing a plurality of air columns distributed over the width of said convex tape guiding surface, extending through said second apertures in said convex tape guiding surface and having resonance frequencies corresponding to tape flutter frequencies to be suppressed; and defining a resonance chamber common and connected to said plurality of air columns.

28. In a method for transporting a tape, an improvement for suppressing a flutter component, comprising in combination the steps of:

defining a convex tape guiding surface and defining first and second distinct apertures in said convex tape guiding surface;

issuing pressurized gas through said first aperture in said convex tape guiding surface;

defining an air column extending through a second aperture in said convex tape guiding surface and having a resonance frequency corresponding to a tape flutter frequency to be suppressed;

defining a further air column extending through a distinct second aperture in said convex tape guiding surface and having a further resonance frequency corresponding to a further tape flutter frequency to be suppressed; and providing a plenum chamber for said air columns.

29. A method as claimed in claim 28, including the step of:

extending said air columns at different depths into said plenum chamber.

* * * * *